US008665053B2

(12) United States Patent
Ogawa et al.

(10) Patent No.: US 8,665,053 B2
(45) Date of Patent: Mar. 4, 2014

(54) LAMINATED CERAMIC ELECTRONIC COMPONENT AND MANUFACTURING METHOD THEREFOR

(75) Inventors: Makoto Ogawa, Nagaokakyo (JP); Akihiro Motoki, Nagaokakyo (JP); Masahito Saruban, Nagaokakyo (JP); Wataru Ogawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 59 days.

(21) Appl. No.: 13/411,863

(22) Filed: Mar. 5, 2012

(65) Prior Publication Data

US 2013/0062994 A1  Mar. 14, 2013

(30) Foreign Application Priority Data

Mar. 22, 2011  (JP) ................. 2011-061984

(51) Int. Cl.
*H01F 5/00* (2006.01)
(52) U.S. Cl.
USPC ........................................................ 336/200
(58) Field of Classification Search
USPC .................. 336/65, 83, 200, 232; 361/321.2, 361/303–309
See application file for complete search history.

(56) References Cited

U.S. PATENT DOCUMENTS

| | | | |
|---|---|---|---|
| 6,960,366 B2 | 11/2005 | Ritter et al. | |
| 6,972,942 B2 | 12/2005 | Ritter et al. | |
| 6,982,863 B2 | 1/2006 | Galvagni et al. | |
| 7,067,172 B2 | 6/2006 | Ritter et al. | |
| 7,152,291 B2 | 12/2006 | Ritter et al. | |
| 7,154,374 B2 | 12/2006 | Ritter et al. | |
| 7,161,794 B2 | 1/2007 | Galvagni et al. | |
| 7,177,137 B2 | 2/2007 | Ritter et al. | |
| 7,344,981 B2 | 3/2008 | Ritter et al. | |
| 7,345,868 B2 | 3/2008 | Trinh | |
| 7,463,474 B2 | 12/2008 | Ritter et al. | |
| 2005/0046536 A1 | 3/2005 | Ritter et al. | |

(Continued)

FOREIGN PATENT DOCUMENTS

JP  63-169014 A  7/1988
JP  2011-009478 A  1/2011

OTHER PUBLICATIONS

Kunishi et al., "Laminated Electronic Component and Method for Manufacturing the Same", U.S. Appl. No. 12/030,282, filed Feb. 13, 2008.

(Continued)

*Primary Examiner* — Tuyen Nguyen
(74) *Attorney, Agent, or Firm* — Keating & Bennett, LLP

(57) ABSTRACT

A method for manufacturing a laminated ceramic electronic component enables formation of a plating film as at least a portion of an external electrode which connects exposed ends of internal electrodes. A component main body including a plurality of ceramic layers and a plurality of internal electrodes partially exposed from the component main body is prepared such that the component main body has a conductive region formed by diffusion of a conductive component included in the internal electrodes at the end surfaces of the ceramic layers located between adjacent exposed ends of the plurality of internal electrodes. The ceramic layers are preferably composed of a glass ceramic containing a glass component of about 10 weight % or more. A plating film is formed directly on the component main body by growing the exposed ends of the internal electrodes and the conductive region as nucleuses for plating deposition.

5 Claims, 2 Drawing Sheets

(56) References Cited

U.S. PATENT DOCUMENTS

| | | |
|---|---|---|
| 2007/0014075 A1 | 1/2007 | Ritter et al. |
| 2008/0123248 A1 | 5/2008 | Kunishi et al. |
| 2008/0123249 A1 | 5/2008 | Kunishi et al. |
| 2008/0158774 A1 | 7/2008 | Trinh |
| 2010/0328842 A1 | 12/2010 | Takeuchi et al. |
| 2012/0320495 A1* | 12/2012 | Akazawa et al. .......... 361/321.2 |

OTHER PUBLICATIONS

Kunishi et al., "Laminated Electronic Component and Method for Manufacturing the Same", U.S. Appl. No. 12/030,360, filed Feb. 13, 2008.

Tani, "Multilayer Electronic Component and Method for Manufacturing the Same", U.S Appl. No. 12/481,690, filed Jun. 10, 2009.

Ito et al., "Laminated Ceramic Electronic Component", U.S. Appl. No. 12/489,631, filed Jun. 23, 2009.

Sasabayashi, "Multilayer Ceramic Electronic Component", U.S. Appl. No. 12/765,965, filed Apr. 23, 2010.

Sasabayashi et al., "Electronic Component", U.S. Appl. No. 13/092,996, filed Apr. 25, 2011.

Takeuchi et al., "Method for Manufacturing Ceramic Electronic Component and Ceramic Electronic Component", U.S. Appl. No. 13/357,671, filed Jan. 25, 2012.

Ogawa et al., "Laminated Ceramic Electronic Component and Manufacturing Method Therefor", U.S. Appl. No. 13/359,519, filed Jan. 27, 2012.

* cited by examiner

FIG. 1 (1)
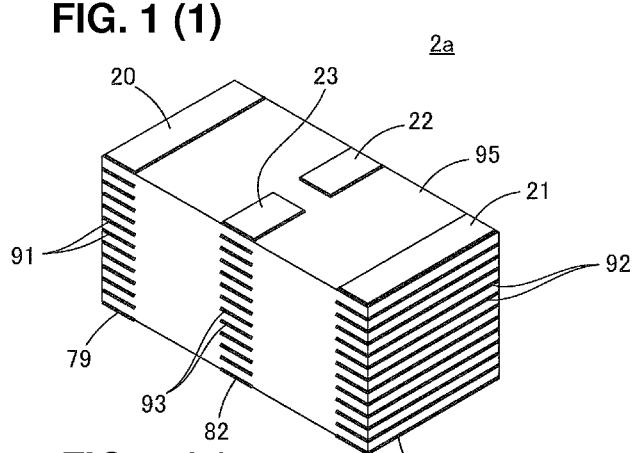
FIG. 1 (2)
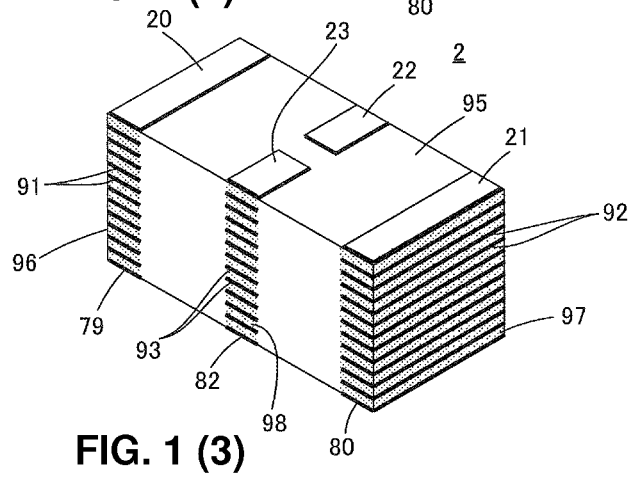
FIG. 1 (3)
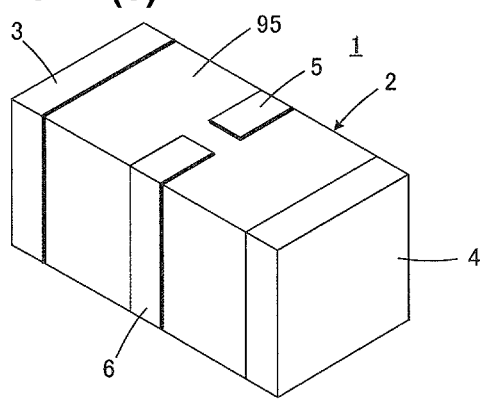

LAMINATED CERAMIC ELECTRONIC COMPONENT AND MANUFACTURING METHOD THEREFOR

BACKGROUND OF THE INVENTION

1. Field of the Invention

The present invention relates to a laminated ceramic electronic component and a method for manufacturing the laminated ceramic electronic component, and more particularly, to a laminated ceramic electronic component including an external terminal electrode formed directly by plating so as to be electrically connected at least partially to a plurality of internal electrodes, and a method for manufacturing the laminated ceramic electronic component.

2. Description of the Related Art

Laminated ceramic electronic components typically include, for example, as in the case of a laminated ceramic capacitor, a component main body having a stacked structure, which includes a plurality of stacked ceramic layers, and a plurality of layered internal electrodes formed along the interfaces between the ceramic layers. The plurality of internal electrodes have respective ends exposed, for example, at each of first and second end surfaces of the component main body, and an external electrode is formed so as to electrically connect the respective ends of the internal electrodes to each other.

For the formation of the external electrodes, typically, a conductive paste containing a metal component and a glass component is applied onto the end surfaces of the component main body, and then subjected to firing, thereby forming paste electrode layers first. The paste electrode layers serve to electrically connect the internal electrodes to each other. Next, a first plating layer containing, for example, nickel as its main constituent is formed on the paste electrode layers, and a second plating layer containing, for example, tin or gold as its main constituent is further formed thereon. The second plating layer is intended to ensure solderability, whereas the first plating layer serves to prevent solder erosion in a solder joint.

As described above, the external electrodes are each typically composed of a three-layer structure of the paste electrode layer, the first plating layer, and the second plating layer.

However, the paste electrode layers have a large thickness of several tens μm to several hundreds μm. Therefore, in order to limit the dimensions of the laminated ceramic electronic component to within certain specifications, there is undesirably a need to reduce the effective volume for ensuring characteristics such as electrostatic capacitance, because there is a need to ensure the volume for the paste electrode layers. On the other hand, the plating layers each have a thickness on the order of several μm. Thus, if the external electrodes can be composed of only plating films, the effective volume can be ensured more for ensuring the electrostatic capacitance.

For example, Japanese Patent Application Laid-Open No. 63-169014 discloses a method for forming an external electrode terminal of a chip capacitor, characterized in that a conductive metal layer is deposited by electroless plating on the entire sidewall surfaces of a chip capacitor element, which are opposed to each other at each end, so as to short-circuit internal electrode layers exposed at the sidewall surfaces, when an external electrode terminal is formed on the chip capacitor element obtained by sintering after alternately stacking ceramic dielectric layers and the internal electrode layers.

In the method described in Japanese Patent Application Laid-Open No. 63-169014, the exposed ends of the internal electrode layers serve as nucleuses for plating deposition in the formation of the plating films to serve as external electrode terminals. Therefore, when the interval is increased between the exposed ends of the internal electrode layers, which are adjacent to each other, the plating film may fail to cover the intervals adequately. In fact, Japanese Patent Application Laid-Open No. 63-169014 discloses the fact that it has been determined that uniform and even favorable external electrode terminals can be formed in the case of ceramic dielectric layers of 30 μm or less in thickness and internal electrode layers of 1 μm or more.

It is to be noted that electroless plating is applied in the method described in Japanese Patent Application Laid-Open No. 63-169014. On the other hand, electrolytic plating is known to have a smaller potential for plating growth as compared with electroless plating. Accordingly, when electrolytic plating is applied for the formation of the plating films, the interval is required to be smaller between the exposed ends of the internal electrode layers, which are adjacent to each other.

SUMMARY OF THE INVENTION

Preferred embodiments of the present invention provide a method for manufacturing a laminated ceramic electronic component, which can form a continuous plating film as at least a portion of an external electrode so as to connect exposed ends of a plurality of internal electrodes, even when the intervals are large between adjacent exposed ends of the internal electrodes.

Other preferred embodiments of the present invention provide a laminated ceramic electronic component which can be manufactured by the manufacturing method described above.

According to a preferred embodiment of the present invention, a method for manufacturing a laminated ceramic electronic component includes a component main body preparation step of preparing a component main body including a plurality of ceramic layers stacked on each other and a plurality of internal electrodes formed along interfaces between the ceramic layers, each of the internal electrodes being partially exposed from the component main body; and an external electrode formation step of forming, on the component main body, an external electrode electrically connected to the plurality of internal electrodes, wherein the external electrode formation step is performed as described below.

The component main body prepared in the component main body preparation step preferably has a conductive region formed by diffusion of a conductive component included in the internal electrodes, at the end surfaces of the ceramic layers located between adjacent exposed ends of the plurality of internal electrodes. Furthermore, the external electrode formation step includes a plating step of causing plating growth with the exposed ends of the internal electrodes in the component main body and the conductive region as nucleuses for plating deposition, thereby forming directly on the component main body, a plating film electrically connected to the plurality of internal electrodes.

The ceramic layers included in the component main body prepared in the component main body preparation step are preferably composed of a glass ceramic containing a glass component of about 10 weight % or more, for example.

The external electrode formation step preferably includes, before the plating step, a step of providing a Pd containing solution to the component main body, thereby substituting the conductive component with Pd at least at a surface of the conductive region.

Particularly when electrolytic plating is applied in the plating step, a preferred embodiment of the present invention is of great significance and achieves excellent advantageous results.

Another preferred embodiment of the present invention provides a laminated ceramic electronic component including a component main body including a plurality of ceramic layers stacked on each other and a plurality of internal electrodes arranged along interfaces between the ceramic layers, each of the internal electrodes being partially exposed from the component main body; and an external electrode arranged on the component main body so as to be electrically connected to the plurality of internal electrodes.

In the laminate-type electronic component according to the present preferred embodiment, the component main body includes a conductive region that is formed by diffusion of a conductive component included in the internal electrodes at the end surfaces of the ceramic layers located between adjacent exposed ends of the plurality of internal electrodes, and the external electrode includes a plated film formed by plating directly on the exposed ends of the internal electrodes in the component main body and the conductive region.

The conductive region preferably has a configuration in the form of islands or webs.

The ceramic layers are preferably composed of a glass ceramic containing a glass component of about 10 weight % or more.

The conductive component is preferably substituted with Pd at least at a surface of the conductive region.

In addition, the plating film is preferably formed by electrolytic plating.

According to various preferred embodiments of the present invention, the conductive region is present at the end surfaces of the ceramic layers located between adjacent exposed ends of the plurality of internal electrodes, thus making it possible to densely distribute nucleuses for plating deposition, which are provided by the exposed ends of the internal electrodes and the conductive region. Therefore, even when the interval is large between adjacent exposed ends of the plurality of internal electrodes, a continuous plating film can be formed easily so as to connect the intervals between the exposed ends of the plurality of internal electrodes.

In addition, unlike in the case of simply attaching conductive particles, according to various preferred embodiments of the present invention, the conductive region is integrated with the ceramic layers, and the plating film that defines an external electrode can thus achieve a high fixing strength. Further, the pathway of moisture ingress is blocked effectively, and the laminated ceramic electronic component can thus improve the sealing property (moisture resistance reliability).

When the ceramic layers are composed of a glass ceramic containing a glass component of about 10 weight % or more, the conductive region is more likely to be formed by diffusion of the conductive component included in the internal electrodes. More specifically, the conductive component (in particular, copper or silver) in the internal electrodes is more likely to diffuse through grain boundaries of the ceramic to form the conductive region distributed in the form of islands or webs at the end surfaces of the ceramic layers.

When the conductive component is substituted with Pd at least at the surface of the conductive region, plating growth is more likely to occur on the conductive region, thereby making it easier to form the continuous plating film. Therefore, electrolytic plating with a smaller potential for plating growth as compared with electroless plating can be applied without any difficulty.

Further, as described previously, when the ceramic layers are composed of a glass ceramic containing a glass component of about 10 weight % or more in such a way that the conductive region is distributed in the form of islands or webs at the end surfaces of the ceramic layers, the substitution with Pd is likely to be caused.

The above and other elements, features, steps, characteristics and advantages of the present invention will become more apparent from the following detailed description of the preferred embodiments with reference to the attached drawings.

BRIEF DESCRIPTION OF THE DRAWINGS

FIGS. 1(1) to 1(3) are perspective views sequentially illustrating steps included in a manufacturing method according to a preferred embodiment of the present invention.

DETAILED DESCRIPTION OF THE PREFERRED EMBODIMENTS

FIG. 1(3) shows the appearance of a laminated ceramic electronic component 1 according to a preferred embodiment of the present invention. First, the structure of the laminated ceramic electronic component 1 will be described with reference to FIGS. 1(1) to 1(3) and FIGS. 2(1) to (12).

The laminated ceramic electronic component 1 includes a component main body 2. The component main body 2 has an appearance shown in FIG. 1(2). The laminated ceramic electronic component 1 shown in FIG. 1(3) is obtained by forming external electrodes 3 and 4 to define terminals on each end of the outer surface of the component main body 2 shown in FIG. 1(2), and forming external electrodes 5 and 6 to define terminals at the midpoint of each side of the outer surface.

This laminated ceramic electronic component 1 preferably defines a chip multilayer LC filter, for example. More specifically, the laminated ceramic electronic component 1, as is clear from the configuration in FIGS. 2(1) to 2 (12) as will be described later, preferably includes two inductances connected in series between the external electrodes 3 and 4, and preferably includes a capacitance between the connection point of the two inductances and the external electrodes 5 and 6.

Figure 2:
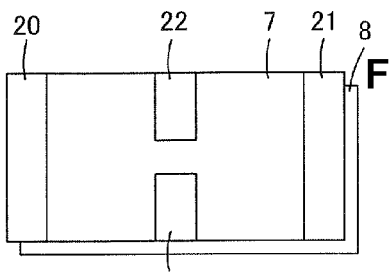
FIGS. 2(1) to 2(12) are plan views illustrating, for each ceramic layer, the configuration of the disassembled component main body of the laminated ceramic electronic component shown in FIGS. 1(1) to 1(3).
Figure 2:
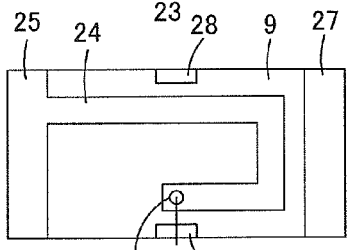
Figure 2:
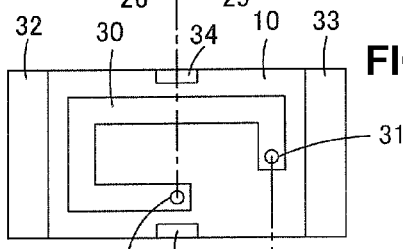
Figure 2:
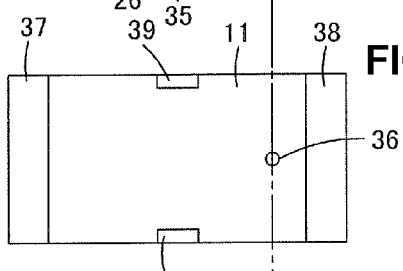
Figure 2:
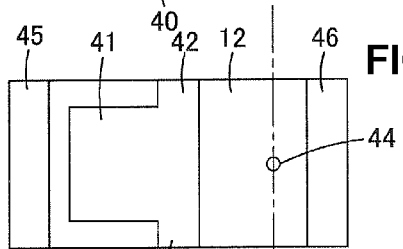
Figure 2:
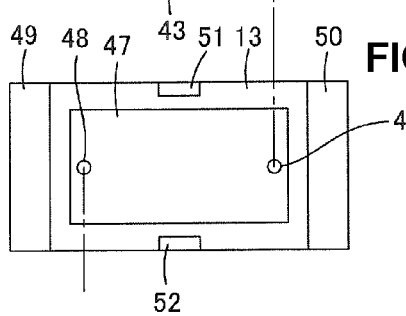
Figure 2:
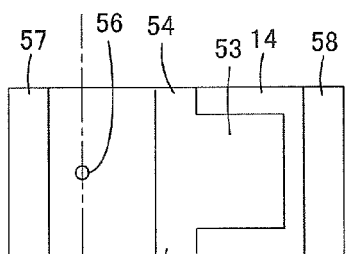
Figure 2:
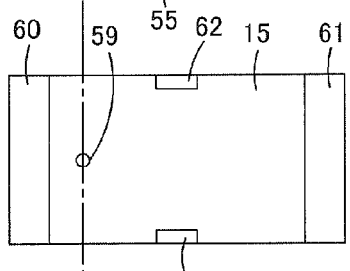
Figure 2:
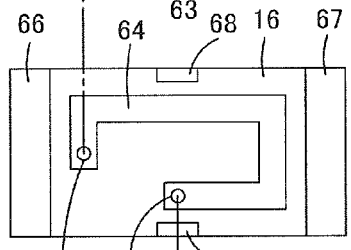
Figure 2:
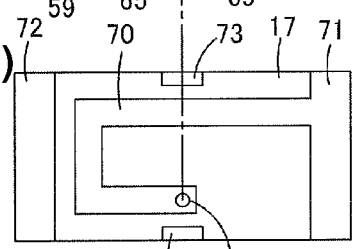
Figure 2:
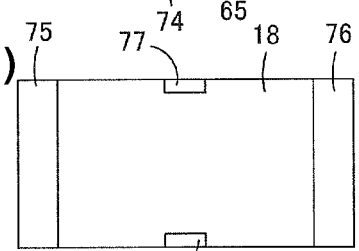
Figure 2:
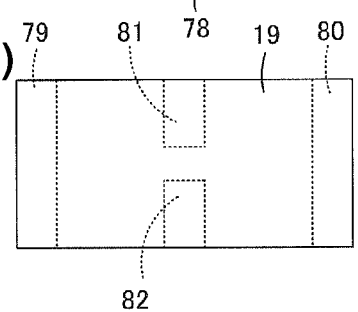

As shown in FIGS. 2(1) to 2(12), the component main body 2 includes a plurality of ceramic layers 7 to 19 stacked on each other. In FIGS. 2(1) to 2(12), the numbers (1) to (12) indicate the order of stacking the ceramic layers 7 to 19 from the top. It is to be noted that the number of ceramic layers included in the component main body 2 is not limited to the number shown in the figures.

The ceramic layers 7 to 19 have electrodes for providing the inductances and capacitance described above, extraction electrodes therefor, or electrodes to serve as nucleuses solely for plating deposition, which are formed, if necessary. Those electrodes will be described below in detail. It is to be noted that in FIGS. 2(1) to 2(12), the electrodes formed on the upper surface of the ceramic layer 7 shown in FIG. 2(1) are intended to be formed on the outer surface of the component main body 2, the electrodes formed on the respective upper surfaces of the ceramic layers 9 to 18 shown in FIGS. 2(2) to 2(11) are intended to be formed along the interfaces between the ceramic layers 9 to 18 and the ceramic layers 8 to 17 stacked on each of the ceramic layers 9 to 18, the electrodes indicated by a dotted line on the ceramic layer 19 shown in FIG. 2(12)

are intended to be formed on the lower surface of the ceramic layer 19, that is, on the outer surface of the component main body 2.

As shown in FIG. 2(1), the ceramic layer 7 includes external dummy electrodes 20 to 23 arranged to define bases for each of the external electrodes 3 to 6 described previously. These external dummy electrodes 20 to 23 are also shown in FIGS. 1(1) and 1(2).

As shown in FIG. 2(2), the ceramic layer 9 includes a coil pattern 24 arranged to define an internal electrode for constituting a portion of the first inductance, and includes an extraction pattern 25 arranged to extend from one end of the coil pattern 24. The position of the extraction pattern 25 corresponds to the position of the external electrode 3. In addition, the other end of the coil pattern 24 includes a via hole conductor 26. Furthermore, the ceramic layer 9 includes internal dummy electrodes 27 to 29 defining internal electrodes to correspond to the positions of the external electrodes 4 to 6 respectively.

As shown in FIG. 2(3), the ceramic layer 10 includes a coil pattern 30 defining an internal electrode that constitutes a portion of the first inductance. In addition, one end of the coil pattern 30 includes a via hole conductor 31. The other end of the coil pattern 29 is connected to the via hole conductor 26 as indicated by an alternate long and short dash line. It is to be noted that the position of the via hole conductor 26 is indicated by the reference numeral of "26" in FIG. 2(3). Furthermore, the ceramic layer 10 includes internal dummy electrodes 32 to 35 defining internal electrodes to correspond to the positions of the external electrodes 3 to 6 respectively.

As shown in FIG. 2(4), the ceramic layer 11 includes a via hole conductor 36 arranged to be connected to the via hole conductor 31 described previously. Furthermore, the ceramic layer 11 includes internal dummy electrodes 37 to 40 defining internal electrodes to correspond to the positions of the external electrodes 3 to 6 respectively.

As shown in FIG. 2(5), the ceramic layer 12 includes a capacitor pattern 41 defining an internal electrode that constitutes a portion of the capacitance, and includes extraction patterns 42 and 43 arranged to extend from the capacitor pattern 41. The positions of the extraction patterns 42 and 43 respectively correspond to the positions of the external electrodes 5 and 6. In addition, the ceramic layer 12 includes a via hole conductor 44 provided to be connected to the via hole conductor 36 described previously. Furthermore, the ceramic layer 12 includes internal dummy electrodes 45 and 46 defining internal electrodes arranged to correspond to the positions of the external electrodes 3 and 4 respectively.

As shown in FIG. 2(6), the ceramic layer 13 includes a capacitor pattern 47 defining an internal electrode that constitutes a portion of the capacitance. The capacitor pattern 47 is opposed to the capacitor pattern 41 described previously with the ceramic layer 12 interposed therebetween. In addition, the ceramic layer 13 includes a via hole conductor 48 arranged to be connected to the capacitor pattern 47. As indicated by an alternate long and short dash line, the capacitor pattern 47 is further connected to the via hole conductor 44, and connected to the end of the coil pattern 30 sequentially through the via hole conductors 36 and 31. It is to be noted that the position of the via hole conductor 44 is indicated by the reference numeral of "44" in FIG. 2(6). Furthermore, the ceramic layer 13 includes internal dummy electrodes 49 to 52 defining internal electrodes arranged to correspond to the positions of the external electrodes 3 to 6 respectively.

As shown in FIG. 2(7), the ceramic layer 14 includes a capacitor pattern 53 defining an internal electrode that constitutes a portion of the capacitance, and includes extraction patterns 54 and 55 arranged to extend from the capacitor pattern 53. The capacitor pattern 53 is opposed to the capacitor pattern 47 described previously with the ceramic layer 13 interposed therebetween. The positions of the extraction patterns 54 and 55 respectively correspond to the positions of the external electrodes 5 and 6. In addition, the ceramic layer 14 includes a via hole conductor 56 arranged to be connected to the via hole conductor 48 described previously. Furthermore, the ceramic layer 14 includes internal dummy electrodes 57 and 58 defining internal electrodes arranged to correspond to the positions of the external electrodes 3 and 4 respectively.

As shown in FIG. 2(8), the ceramic layer 15 includes a via hole conductor 59 arranged to be connected to the via hole conductor 56 described previously. Furthermore, the ceramic layer 15 includes internal dummy electrodes 60 to 63 defining internal electrodes to correspond to the positions of the external electrodes 3 to 6 respectively.

As shown in FIG. 2(9), the ceramic layer 16 includes a coil pattern 64 defining an internal electrode that constitutes a portion of the second inductance. In addition, one end of the coil pattern 64 includes a via hole conductor 65 provided. As indicated by an alternate long and short dash line, the other end of the capacitor pattern 64 is connected to the via hole conductor 59, and connected to the coil pattern 47 sequentially through the via hole conductors 56 and 48. It is to be noted that the position of the via hole conductor 59 is indicated by the reference numeral of "59" in FIG. 2(9). Furthermore, the ceramic layer 16 includes internal dummy electrodes 66 to 69 defining internal electrodes arranged to correspond to the positions of the external electrodes 3 to 6 respectively.

As shown in FIG. 2(10), the ceramic layer 17 includes a coil pattern 70 defining an internal electrode that constitutes a portion of the second inductance, and includes an extraction pattern 71 arranged to extend from one end of the coil pattern 70. The position of the extraction pattern 71 corresponds to the position of the external electrode 4. In addition, the other end of the coil pattern 70 is connected to the via hole conductor 65 as indicated by an alternate long and short dash line. It is to be noted that the position of the via hole conductor 65 is indicated by the reference numeral of "65" in FIG. 2(10). Furthermore, the ceramic layer 17 includes internal dummy electrodes 72 to 74 defining internal electrodes arranged to correspond to the positions of the external electrodes 3, 5, and 6 respectively.

As shown in FIG. 2(11), the ceramic layer 18 includes internal dummy electrodes 75 to 78 defining internal electrodes arranged to correspond to the positions of the external electrodes 3 to 6 respectively.

As shown in FIG. 2(12), the ceramic layer 19 includes external dummy electrodes 79 to 82 defining bases for each of the external electrodes 3 to 6 described previously.

It is to be noted that while the ceramic layer 8 is partially shown below the ceramic layer 7 in FIG. 2(1), an appropriate number of ceramic layers similar to the ceramic layer 8 may be inserted between the ceramic layer 7 and the ceramic layer 9 described next. Likewise, the ceramic layer 11 shown in FIG. 2(4), the ceramic layer 15 shown in FIG. 2(8), and the ceramic layer 18 shown in FIG. 2(11) may be omitted, or ceramic layers in similar forms may be further stacked thereon.

In addition, some of the internal dummy electrodes 27 to 29, 32 to 35, 37 to 40, 45, 46, 49 to 52, 57, 58, 60 to 63, 66 to 69, 72 to 74, and 75 to 78 may be omitted.

The ceramic layers 7 to 19 are preferably composed of a glass ceramic containing a glass component of about 10 weight % or more, for example.

In addition, the conductors included in the component main body 2, such as the external dummy electrode 20, the coil pattern 24, the via hole conductor 26, the internal dummy electrode 27, and the capacitor pattern 41, preferably include, for example, a sintered body of a conductive paste containing copper or silver as a conductive component.

In order to obtain the component main body 2 which has the stacked structure described above, a raw component main body 2a shown in FIG. 1(1) is produced through well known steps such as forming of ceramic green sheets, printing of a conductive paste onto the ceramic green sheets and filling of via holes with the conductive paste, stacking and pressing of the ceramic green sheets, and cutting of a laminated body of ceramic green sheets.

In the following description, in the case of the raw component main body 2a shown in FIG. 1(1) or the component main body 2 shown in FIG. 1(2), the internal electrodes arranged to be connected to the external electrode 3, such as the extraction pattern 25 and the internal dummy electrode 32, are collectively referred to as "internal electrodes 91", the internal electrodes located to be connected to the external electrode 4, such as the internal dummy electrode 27 and the extraction pattern 71, are collectively referred to as "internal electrodes 92", and the internal electrodes located to be connected to the external electrode 6, such as the internal dummy electrode 29 and the extraction pattern 55, are collectively referred to as "internal electrodes 93". It is to be noted that, although not shown in FIG. 1(1) or 1(2), the internal electrodes arranged to be connected to the external electrode 5, such as the internal dummy electrode 28 and the extraction pattern 54, are collectively referred to as "internal electrodes 94". In addition, the ceramic layers 7 to 19 are likewise indicated by the reference numeral of "95" in FIGS. 1(1) and 1(2).

The raw component main body 2a shown in FIG. 1(1) is then subjected to firing. This firing provides the sintered component main body 2 shown in FIG. 1(2). The component main body 2 includes, as shown in FIGS. 2(1) to 2(12), the sintered ceramic layers 7 to 19, as well as the conductors 20 to 82 (see FIGS. 2(1) to 2(12)) such as the external dummy electrode 20, the coil pattern 24, the via hole conductor 26, the internal dummy electrode 27, and the capacitor pattern 41. Furthermore, the component main body 2 includes, as indicated by "hatching" in FIG. 1(2), conductive regions 96, 97, and 98 located on the end surfaces of the ceramic layers 95 located respectively between adjacent exposed ends of the plurality of internal electrodes 91, between adjacent exposed ends of the plurality of internal electrodes 92, and between adjacent exposed ends of the plurality of internal electrodes 93. These conductive regions 96 to 98 are formed by diffusion of the conductive component included in the internal electrodes 91 to 93.

Further, although not shown in FIG. 1(2), a conductive region 99 obtained by diffusion of the conductive component included in the internal electrodes 94 is also formed on the end surfaces of the ceramic layers 95 located respectively between adjacent exposed ends of the internal electrodes 94 located to be connected to the external electrode 5.

In addition, in this preferred embodiment, the external dummy electrodes 20 to 23 and 79 to 82 are formed to cause the conductive component included in the external dummy electrodes 20 to 23 and 79 to 82 to also diffuse. Thus, the conductive regions 96 to 99 extend to the end surfaces of the ceramic layers 95 constituting the outermost layers located between the external dummy electrodes 20 to 23 and 79 to 82 and the internal electrodes 91 to 94.

The diffusion of the conductive component is more likely to be caused when the ceramic layers 95 are composed of a glass ceramic containing a glass component of about 10 weight % or more. In this case, the conductive component included in the internal electrodes 91 to 94 as well as in the external dummy electrodes 20 to 23 and 79 to 82 diffuses through grain boundaries of the ceramic to form the conductive regions 96 to 99 distributed in the form of islands or webs at the end surfaces of the ceramic layers 95. This phenomenon is likely to be caused when the conductive component is particularly copper or silver.

Next, preferably, a step is carried out for providing a Pd containing solution to the component main body 2, thereby substituting the conductive component with Pd at least at the surfaces of the conductive regions 96 to 99. This step makes it more likely that plating growth is caused on the conductive regions 96 to 99 in a subsequent plating step, thereby facilitating the formation of continuous plating films. Therefore, this step allows electrolytic plating with a smaller potential for plating growth as compared with electroless plating to be applied more easily in the plating step. Further, as a result of this Pd substitution step, the conductive component is also substituted with Pd at the exposed ends of the internal electrodes 91 to 94 as well as at the respective surfaces of the external dummy electrodes 20 to 23 and 79 to 82.

As described previously, when the ceramic layers 95 are composed of a glass ceramic containing a glass component of about 10 weight % or more such that the conductive regions 96 to 99 are distributed in the form of islands or webs at the end surfaces of the ceramic layers 95, the substitution with Pd is likely to be caused.

Next, the component main body 2 is subjected to a plating step. In the plating step, for example, electrolytic Ni plating is carried out to cause plating growth while using, as nucleuses of plating deposition, the exposed ends of the internal electrodes 91 to 94, the conductive regions 96 to 99, as well as the external dummy electrodes 20 to 23 and 79 to 82 in the component main body 2, thereby forming, directly on the component main body 2, uniform Ni plating films electrically connected to each of the groups of internal electrodes 91 to 94.

Next, after carrying out a cleaning step with pure water, preferably, the component main body 2 with the first plating films formed such as the Ni plating films described above is subjected to a heat treatment. As the heat treatment temperature, a temperature of, for example, about 600° C. or more, preferably about 800° C. or more is used.

The Ni plating films are intended to constitute at least portions of the external electrodes 3 to 6 shown in FIG. 1(3), and then, for example, electrolytic Sn plating is carried out, if necessary.

Next, after carrying out a cleaning step with pure water, drying is carried out to complete the laminated ceramic electronic component 1.

It is to be noted that electroless plating may be applied, rather than electrolytic plating, in the Ni plating and Sn plating described above.

As described above, while the laminated ceramic electronic component 1 is intended to constitute an LC filter in this preferred embodiment, the present invention can be also applied to, other than LC filters, other laminated ceramic electronic components constituting, for example, laminated ceramic capacitors, inductors, thermistors, piezoelectric components, etc.

Next, non-limiting experimental examples will be described below which were carried out for confirming the advantageous effects of various preferred embodiments of the present invention.

Example 1

1. Preparation of Component Main Body

The following component main body for a chip multilayer LC filter was prepared as a component main body for a laminated ceramic electronic component as a sample. More specifically, this component main body had planar dimensions of 3.2 mm in length and 1.6 mm in width, ceramic layers were composed of a glass ceramic including $SiO_2$—$B_2O_3$ based glass: 15 weight % and $Ba((Co,Zn),Nb)O$ based ceramic: 85 weight %, and Cu was a conductive component of conductors such as external dummy electrodes, internal dummy electrodes, coil patterns, capacitor patterns, extraction patterns, and via hole conductors. In addition, the interval was 40 μm between the respective exposed ends of the internal electrodes such as the internal dummy electrodes and the extraction patterns, and the thickness was 2 μm for each exposed end. In addition, the firing temperature was 1040° C. for the achievement of the component main body, and the component main body had a conductive region formed by diffusion of a conductive component included in the internal electrodes, at the end surfaces of the ceramic layers located between adjacent exposed ends of the plurality of internal electrodes.

2. Pd Substitution

Next, the component main body was immersed for 3 minutes in a palladium chloride containing solution (25° C.) at pH: 2.0 with a $Pd^{2+}$ ion concentration of 100 ppm to substitute Cu as the conductive component with Pd at least at the surface of the conductive region.

3. Plating

The following plating system conditions were applied.

The component main body as an object to be plated for 20 ml in volume was put in a horizontal rotation barrel of 300 cc in drum volume and 70 mm in diameter, in addition, in which 40 ml of an Sn medium of 0.7 mm in diameter was put, and 50 cc of nylon coated iron balls of 8.0 mm in diameter was put as stirring balls, and for carrying out electrolytic plating while rotating the barrel at the rotation number of 20 rpm.

Under the plating system conditions mentioned above, electrolytic Ni plating was first carried out with the use of the following Watts bath under a current applying condition of 9 A for 120 minutes to form a Ni plating film with a film thickness of 6 μm on the exposed ends of the internal electrodes and the conductive region.
Watts Bath
Nickel Sulfate: 300 g/L
Nickel Chloride: 45 g/L
Boric Acid: 40 mg/L
pH: 4.0
Bath Temperature: 55° C.

Then, cleaning with pure water was carried out.

Next, under the same plating system conditions, "NB-RZS" (pH: 4.5; bath temperature: 30° C.) from Ishihara Chemical Co., Ltd. was used as a plating bath to form an Sn plating film with a film thickness of 3 μm on the Ni plating film.

Then, after carrying out cleaning with pure water, drying was carried out at 80° C. for 15 minutes in air.

Example 2

1. Preparation of Component Main Body

The same component main body for a chip multilayer LC filter was prepared as in the case of Example 1.

2. Pd Substitution

Next, under the same conditions as in the case of Example 1, the Cu as a conductive component was substituted with Pd at least at the surfaces of conductive regions on the component main body.

3. Plating

Next, under the same plating system conditions as in the case of Example 1, before electrolytic Ni plating, electrolytic Cu plating was first carried out with the use of the following Cu plating bath under a current applying condition of 8 A for 140 minutes to form a Cu plating film with a film thickness of 6 μm on the exposed ends of the internal electrodes and the conductive region.
Cu Plating Bath
Copper Pyrophosphate: 14 g/L
Pyrophosphoric Acid: 120 g/L
Potassium Oxalate: 10 g/L
pH: 8.7
Bath Temperature: 30° C.

Then, cleaning with pure water was carried out.

Next, the plated component main body was subjected to a heat treatment at a temperature: 750° C. for 20 minutes in an $N_2$ atmosphere.

Next, under the same conditions as in the case of Example 1, electrolytic Ni plating and electrolytic Sn plating were carried out to form a Ni plating film with a film thickness of 6 μm on the Cu plating film, and an Sn plating film with a film thickness of 3 μm thereon sequentially. After the electrolytic Ni plating and after the electrolytic Sn plating, cleaning with pure water was carried out, and finally, drying was carried out at 80° C. for 15 minutes in air.

Comparative Example 1

1. Preparation of Component Main Body

Except that ceramic layers were composed of a glass ceramic including $SiO_2$-$B_2O_3$ based glass: 5 weight % and $Ba((Co,Zn),Nb)O$ based ceramic: 95 weight %, the same component main body was prepared as in the case of Example 1. It is to be noted that in the case of the component main body according to Comparative Example 1, a conductive region to be formed by diffusion of a conductive component included in a plurality of internal electrodes was not fully confirmed at the end surfaces of ceramic layers located between adjacent exposed ends of the internal electrodes.

2. Pd Substitution

The Pd substitution step was not carried out in Comparative Example 1.

3. Plating

Next, electrolytic Ni plating was carried out under the same conditions as in the case of Example 1. However, the Ni plating was poor in deposition property, and the experiment was thus ended at this point.

Comparative Example 2

1. Preparation of Component Main Body

The same component main body was prepared as in the case of Comparative Example 1.

2. Pd Substitution

In Comparative Example 2, while the Pd substitution step was not carried out, a Pd thin film was formed by sputtering in place of the Pd substitution in a region where the exposed ends of the internal electrodes were arranged in the component main body.

3. Plating

Next, under the same conditions as in the case of Example 1, electrolytic Ni plating and electrolytic Sn plating were carried out to form a Ni plating film with a film thickness of 6 μm on the Pd thin film, and a Sn plating film with a film thickness of 3 μm thereon sequentially. After the electrolytic Ni plating and after the electrolytic Sn plating, cleaning with pure water was carried out, and finally, drying was carried out at 80° C. for 15 minutes in air.

Evaluations

Table 1 shows evaluation results.

Deposition Property

The plating film to serve as an external electrode was observed for each sample to determine the sample as pass if a continuous film was formed, and the pass is represented by the mark "○" in Table 1. On the other hand, the sample was determined as reject if no continuous film was formed, and the reject is represented by the mark "x" in Table 1.

Fixing Strength

A block of 1 mm×1 mm in bottom dimension made by brass Ni-coated and Sn-coated thereon was joined by soldering to the external electrode for each sample, and the fracture strength was measured when the block was pulled in a vertical direction with the surface of the external electrode placed in a horizontal direction, and determined as a fixing strength. If the fixing strength was 10 N or more, the sample was determined as pass. It is to be noted that as for Comparative Example 1, the fixing strength was not measured because the deposition property was determined as "x".

TABLE 1

|  | Deposition Property | Fixing Strength |
|---|---|---|
| Example 1 | ○ | 40 N |
| Example 2 | ○ | 60 N |
| Comparative Example 1 | X | — |
| Comparative Example 2 | ○ | 8 N |

According to Examples 1 and 2, excellent results were achieved in terms of deposition property and fixing strength. In particular, Example 2 exhibited the higher fixing strength as compared with Example 1, because the heat treatment was carried out after the formation of the Cu plating film.

On the other hand, Comparative Example 1 was poor in deposition property, because the conductive region was not formed sufficiently between the exposed ends of the internal electrodes in the component main body.

In addition, Comparative Example 2 was excellent in deposition property because of the Pd thin film formed on the component main body, but exhibited a low fixing strength less than 10 N because the Pd thin film was formed by sputtering.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A laminated ceramic electronic component comprising:
a component main body including a plurality of ceramic layers stacked on each other and a plurality of internal electrodes arranged along interfaces between the ceramic layers, each of the internal electrodes being partially exposed from the component main body; and
an external electrode arranged on the component main body so as to be electrically connected to the plurality of internal electrodes; wherein
the component main body includes a conductive region formed by diffusion of a conductive component included in the internal electrodes at end surfaces of the ceramic layers located between adjacent exposed ends of the plurality of internal electrodes; and
the external electrode includes a plated film disposed directly on the exposed ends of the internal electrodes in the component main body and the conductive region.

2. The laminated ceramic electronic component according to claim 1, wherein the conductive region has an island-shaped configuration or a web-shaped configuration.

3. The laminated ceramic electronic component according to claim 1, wherein the ceramic layers comprise a glass ceramic containing a glass component of about 10 weight % or more.

4. The laminated ceramic electronic component according to claim 1, wherein the conductive component is substituted with Pd at least at a surface of the conductive region.

5. The laminated ceramic electronic component according to claim 1, wherein the plating film is an electrolytically plated film.

* * * * *